United States Patent [19]

Natter

[11] 4,268,242
[45] May 19, 1981

[54] PEDAGOGIC MOLDING APPARATUS

[76] Inventor: Howard Natter, c/o Honatech, 400 Walnut St., Yonkers, N.Y. 10701

[21] Appl. No.: 778,680

[22] Filed: Mar. 17, 1977

[51] Int. Cl.³ .............................................. B29C 17/07
[52] U.S. Cl. .................................... 425/182; 425/526; 425/532
[58] Field of Search ............ 425/532, 526, 541, 450.1, 425/451.2, 451.3, 451.7, 182

[56] References Cited

U.S. PATENT DOCUMENTS

| | | | |
|---|---|---|---|
| 2,290,129 | 7/1942 | Moreland et al. | 425/526 X |
| 2,349,177 | 5/1944 | Kopitke | 425/526 X |
| 3,428,722 | 2/1969 | Chittenden et al. | 425/532 X |
| 3,537,936 | 11/1970 | Leblond | 156/405 |
| 3,583,620 | 6/1971 | Postina | 226/172 |
| 3,796,531 | 3/1974 | Bowers | 425/541 |
| 3,807,929 | 4/1974 | Moore | 425/541 |

FOREIGN PATENT DOCUMENTS 2542015 3/1977 Fed. Rep. of Germany ...... 425/541
983440 2/1965 United Kingdom ................ 425/532

*Primary Examiner*—Richard B. Lazarus
*Attorney, Agent, or Firm*—Natter & Natter

[57] ABSTRACT

An apparatus for instruction in the techniques of blow molding includes an air cylinder actuated ram parison extruder secured atop a frame carrying a low mass mold set. The mold set includes two thin wall mold segments mounted for reciprocal travel toward a closed position at a molding station. Each mold segment is adjustably secured to one of a pair of webbed, heat dissipating jaws with each jaw being adjustably mounted to a worm-driven carriage. Mold segment set up is accomplished by loosely mounting the jaws to their respective carriages and the mold segments to their jaws; the jaws are brought toward one another to close and align the mold segments. With the segments closed and registered, they are then tightened to the jaws and the jaws to the carriages thereby assuring repeated registration of the mold segments during molding cycles.

6 Claims, 4 Drawing Figures

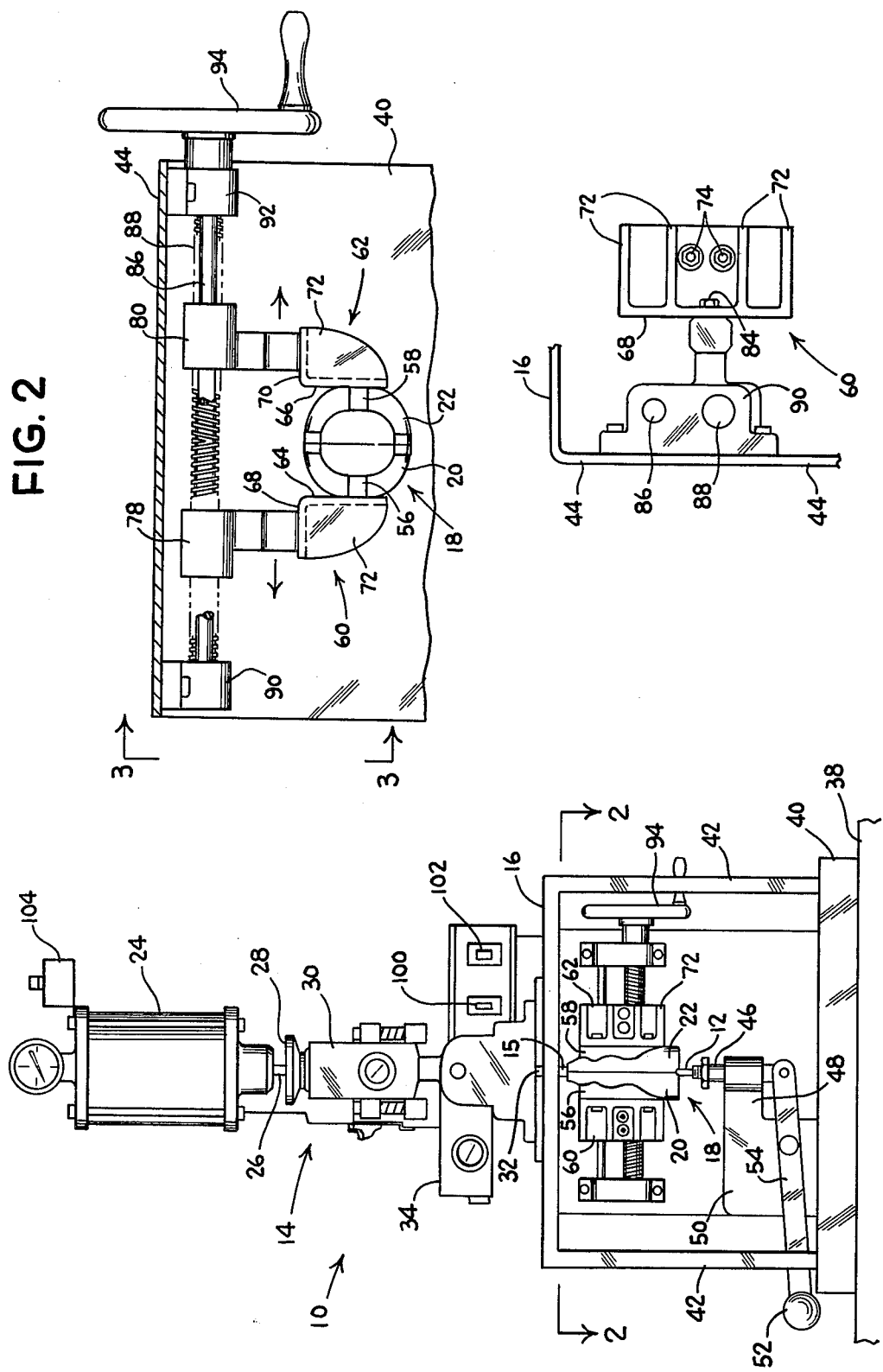

PEDAGOGIC MOLDING APPARATUS

BACKGROUND OF THE INVENTION

1. Field of the Invention

This invention relates to pedagogic shop apparatus for instruction in plastics forming technology and more particularly to a blow molding apparatus suitable for such purposes.

2. Brief Description of the Prior Art

Previous attempts at teaching various techniques of the fabrication of plastic products to young pupils, e.g. high school and middle or junior high school students, resulted in the realization that in most instances the utilization of actual production equipment proved ineffectual.

The methods and apparatus of blow molding fabrication represent a substantial area of technology suitable for instruction to students. Modern blow molding methods are hybrids of plastics processing and glass blowing technology. Initial attempts at blow molding hollow objects such as bottles from a charge of molten plastic in a manner similar to that used in glass blowing proved ineffectual since the plastic material did not have a propensity for providing uniformity of wall thickness upon expansion as does glass.

Successful results were achieved through the utilization of a hollow closed end tube of viscous plastic known as a parison and blowing the viscous parison within a hollow mold. Parisons have been produced by heat sealing the bottom of an open viscous tube formed by continuous or ram extrusion. Alternatively, parisons were produced by injection molding a closed end tube.

Instruction in the principles and theory of blow molding could not readily be accomplished with student operation of actual production machinery. Such machinery was generally quite expensive, cumbersome, and much too intricate for the purpose of explanation and illustration of the various stages of the process. In some instances the complexity of such equipment was such that the desired pedagogic objectives were obfuscated. Further, since the majority of such machinery was automated to some extent, student control of stages of the molding cycle was not attainable.

Additionally, commercial blow molding equipment was inappropriate for school shop usage, since the primary design objective was production runs of commercial products utilizing custom designed molds. Set up of such equipment was quite complex and time consuming; however in commercial applications set up costs were amortized over the production run.

A prime factor in commercial blow molding cycles is the time required for cooling of parts. In many commercial applications, cooling time often constitutes as much as 90% of the total cycle time, hence cooling efficiency has become a significant factor in the design of molds and blow molding equipment. For this reason most blow molding equipment utilized water cooled molds having appropriate partitions or drilled channels to accommodate a flow of cooling water. Understandably, commercial blow molding equipment was unsuitable for use in classroom environments due to equipment costs and complexity of operation.

Students in a school shop did not require automated machinery. Nonautomated equipment capable of performing the actual processes, yet simple in design without complexities such as water cooling apparatus, was required. Such equipment would ideally allow students to operate the machinery in classroom surroundings permitting observation and participation in the various stages of a production cycle. Also of significant educational value is a pedagogic machine wherein the student actually attempts setting up the equipment for a particular project.

Other problems encountered with attempts to adapt prior machinery for pedagogic use have been the loss of the student's interest usually attributed to the performance of perfunctory tasks in a fabricating cycle of a machine set up by the instructor another student.

When students actually did set up molds in school shop molding equipment, it has been found that they were prone to error and various difficulties were encountered. Particularly with blow molding equipment, where a pair of mold segments were mounted for reciprocal movement to mate in registration over a hot extruded parison, proper realignment of mold segments after mold separation was difficult for students.

SUMMARY OF THE INVENTION

In compendium, the present invention comprises a pedagogic blow molding apparatus having a simplified mold set up procedure. The apparatus includes a pair of jaws, each supporting a thin-walled mold segment with the jaws mounted to a carriage for reciprocal travel toward a molding station. The jaws reduce molding cycle time by providing heat dissipating webbed surfaces. Registration of the mold segments is facilitated by locating pins extending frm one segment into sockets of the other segment with each segment being adjustably mounted to a respective jaw and each jaw being adjustably mounted to a carriage.

In setting up the mold, the jaws are brought towards one another to a position wherein the mold segments are registered and mated; thereafter the mold segments are tightly secured to their respective jaws and the jaws tightly secured to their respective carriages.

From the above compendium, it should be seen that it is an object of the present invention to provide a pedagogic blow molding apparatus of the general character described which is not subject to the disadvantages aforementioned.

Another object of the present invention is to provide a pedagogic molding apparatus of the general character described which is well adapted for use in the instruction of young students through participation in actual plastics fabrication procedures.

Yet a further object of the present invention is to provide a pedagogic blow molding apparatus of the general character described which is adapted for school use providing simplified operation with but a modicum of components.

A further object of the present invention is to provide a pedagogic blow molding apparatus which is relatively low in cost, rugged in construction and particularly well adapted for use in school shops.

Another object of the present invention is to provide a pedagogic blow molding apparatus of the general character described which permits rapid mold cooling without water cooling apparatus.

Another object of the present invention is to provide a pedagogic blow molding apparatus of the general character described which provides simplified set up well adapted for young students.

Other objects of the invention in part will be obvious and in part will be pointed out hereinafter.

With these ends in view, the invention finds embodiment in the various combinations of elements and arrangements of parts by which the said objects and certain other objects are hereinafter attained, all as fully described with reference to the accompanying drawings and the scope of which is more particularly pointed out and indicated in the appended claims.

BRIEF DESCRIPTION OF THE DRAWINGS

In the accompanying drawings in which is shown one of the various possible exemplary embodiments of the invention:

FIG. 1 is a front elevational view of a pedagogic blow molding apparatus constructed in accordance with and embodying the invention and illustrating a parison extruder positioned above a mold set which is mounted for reciprocal movement along a horizontal axis;

FIG. 2 is an enlarged scale auxiliary plan view taken substantially along the line 2—2 of FIG. 1 and more clearly showing details of a mold supporting structure;

FIG. 3 is an auxiliary side elevation view of the mold supporting structure, the same being taken substantially along the line 3—3 of FIG. 2 and showing one of a pair of jaws secured to a carriage mount.

DESCRIPTION OF THE PREFERRED EMBODIMENT

Figure 4:
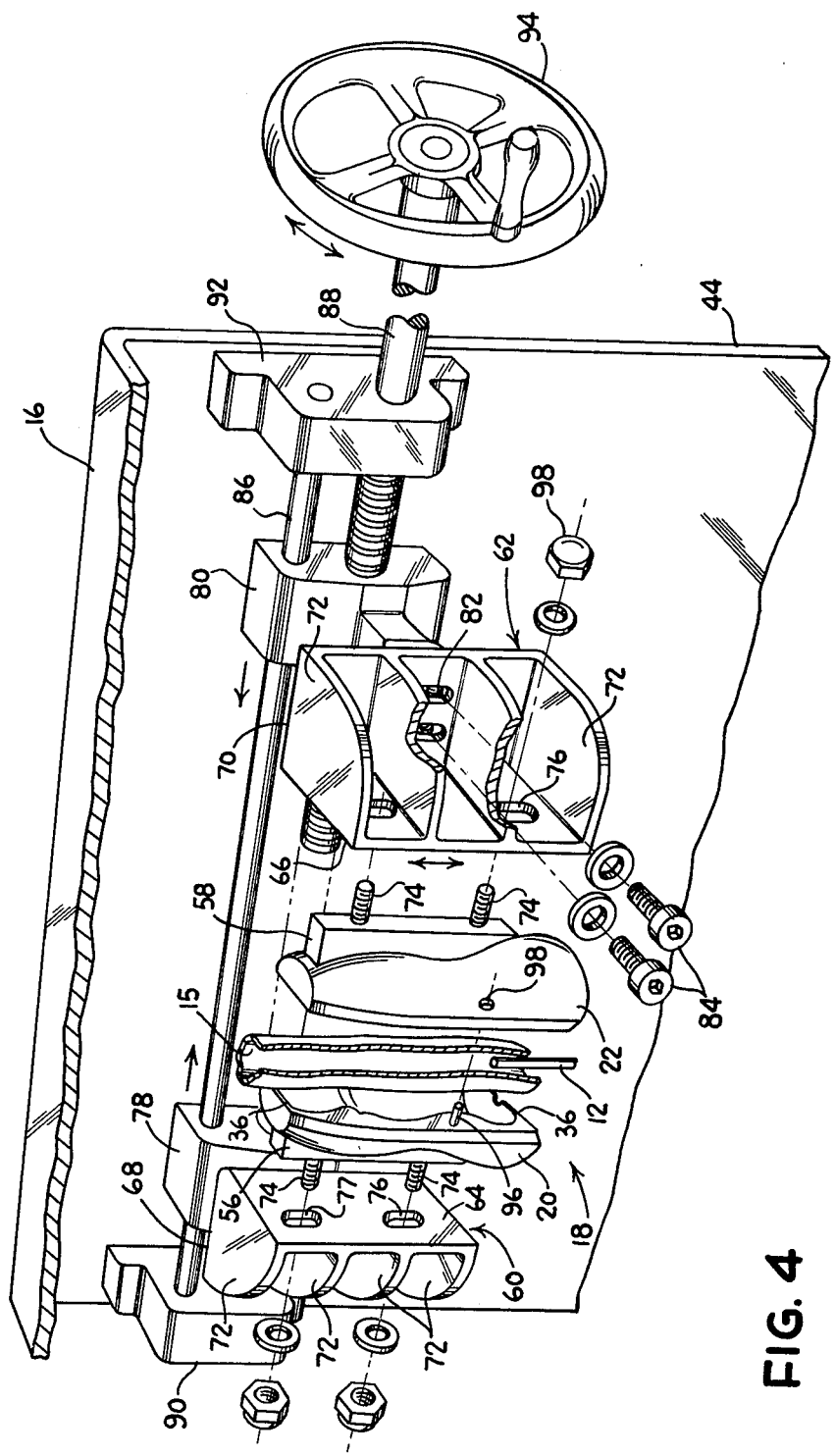
FIG. 4 is an exploded perspective illustration of the mold supporting structure with portions broken away for clarity to show operational details thereof and illustrating various simplified adjustments which may be achieved relative to the mold segments, the jaws and the carriage mounts.

Referring now in detail to the drawings, the reference numeral 10 denotes a pedagogic apparatus for instruction in the techniques of blow molding, constructed in accordance with and embodying the invention and being particularly adapted for the fabrication of blow molded articles by students.

The apparatus 10 is designed to blow mold a viscous parison 15 which is ram extruded along an axis of a blow needle 12 mounted for reciprocal movement beneath the parison 15.

The parison is formed at a ram extruder 14 mounted on a supporting platform 16 and positioned above a mold set 18 comprising a pair of mold segments 20 and 22 respectively mounted for reciprocal travel from a closed molding station wherein the mold segments encapsulate the parison 15 as shown in FIGS. 1 and 2 to an open position as shown in FIG. 4.

The ram extruder 14 is shown in an exemplary fashion only as constituting a modified air cylinder actuated injection molder primarily designed for school use. Injection molders of this type are commercially available from Honatech, Inc., 400 Walnut Street, Yonkers, New York, 10701, as Model No. 10Z. Alternatively, a manual purchase actuated ram injection molder such as Honatech Model No. 1116 may be utilized.

The ram extruder 14 illustrated includes an air cylinder 24 which actuates a ram 26 to force a charge of thermoplastic material, e.g. polyethylene, polyvinyl chloride, polycarbonate, etc., from a hopper 28 into a heated cylinder 30 and to extrude the molten thermoplastic from the cylinder. In accordance with the present invention, the conventional injection nozzle is not provided and the molten thermoplastic is extruded through a parison nozzle 32 partially jacketed within a heating block 34.

It should be appreciated that the heating block 34 includes a thermostatically controlled electric heating element to elevate the nozzle temperature so that the parison is extruded at the proper viscosity enabling it to hold its shape for a sufficient time to be blown against the interior walls of the mold set 18, yet have sufficient weld strength to be sealed at mold pinch-off zones 36.

The mold set 18 is adapted in an exemplary fashion to form one of a plurality of hollow articles such as chess playing pieces adapted for use as part of a chess set in a school shop project. Alternate mold sets are provided for the remainder of the chess playing pieces as well as other projects such as bottles, salt shakers, etc., all of which are provided with or available for the blow molding apparatus as a complete package in conjunction with school classroom usage.

As can be observed in FIG. 1, the platform 16 supporting the ram extruder 14 is spaced from an apparatus supporting surface 38 and extends in a plane parallel thereto. The platform 16 is maintained in a position elevated from a base 40 by a pair of forward upright legs 42 and a depending rear panel 44 which may be formed in one piece with the panel 16 as illustrated in FIGS. 3 and 4. The rear panel 44 extends in a vertical plane perpendicular to that of the base 40 and the platform 16.

As mentioned heretofore, the blow needle 12 is mounted for reciprocal movement along an axis coincident with the axis of parison extrusion. For this purpose, the needle 12 is secured within a collar 46 which is slidably received within a vertical bore of a supporting arm 48 which projects from a vertical flange 50 mounted to the base 40. To raise the blow needle to the operative (blowing) position of a molding cycle (illustrated in FIG. 1) a knob 52 at the distal end of an operating lever 54 is depressed with the opposite end of the lever 54 being pivotally connected to the collar 46.

To speed mold cycle time, thereby maintaining student interest the present invention utilizes, in lieu of water cooled molds, a combination of low mass thin walled mold segments and a pair of heat dissipating jaws 60, 62. Typical mold wall thickness in the proximity of the mold cavity is in the order of one eighth inch (3 mm.). The jaws 60, 62 each include a planar mold engaging face or panel 64, 66 and a mounting face or panel 68, 70 with the mold engaging panel perpendicular to the mounting panel. Mold heat is rapidly drawn from the mold segments with assistance of a plurality of cooling webs or fins 72 each of which extends along a horizontal plane spanning the panels.

To mount the mold segments 20, 22 to their respective jaws, a pair of threaded shanks 74 project from a vertical spine 56, 58 of each mold segment into an oversized vertically slotted aperture 76 in each of the mounting faces 64, 66.

Reciprocal movement of the mold segments 56, 58 toward and away from a molding station coincident with the axis of parison extrusion is achieved through a pair of worm driven carriages 78, 80 with the mounting face 68 of the mold segment 60 secured to the carriage 78 and the mounting face 70 of the jaw 62 secured to the carriage 80. Each of the mounting faces 68, 70 includes an oversized vertically slotted aperture 82 through which appropriate fastening means 84, e.g. socket head set screws, bolts, etc., are inserted for threaded engagement with each of the carriages 78, 80.

Each carriage includes a pair of vertically spaced horizontal bores through one of which extends a stabilizing guide rail 86. The other bore of each carriage is in threaded engagement with respective right or left hand threaded zones of a worm shaft 88 journalled at one end to a supporting post 90 and adjacent the opposite end to a supporting post 92 with each of the supporting posts being mounted to the rear panel 44. Actuation of the worm shaft 88 by rotation of a hand wheel 94 provides converging and diverging movement of the carriages 78, 80 and their respective jaws 60, 62 as well as the respective mold segments 20, 22 to position the mold segments at the molding station or separate the segments to permit extrusion of a new parison 15.

A feature of the present invention resides in the structure which achieves simplified mold set-up and repeated registration of the mold segments 20, 22 at the molding station. Initially, it should be appreciated that the mold set 18 is adapted for encapsulating an extruded parison 15 with the segments 20 and 22 in registration at the molding station. To facilitate such registration, a pair of locating pins 96 extend from one of the segments into a registration aperture or socket 98 of the other.

In setting up the apparatus 10 the student initially secures each mold segment to its respective jaw face 64, 66 with a nut 98 being threadingly engaged over each shank 74. It should be understood that at this stage the nuts 98 are not tightened. Further, it is desirable that the set screws 84 which mount the jaws to their respective carriages 78, 80 be loose enough to permit adjustment of each jaw along a vertical axis.

After each mold segment is secured to the respective jaw, the hand wheel 94 is rotated to close the mold segments together. With the assistance of the locating pins 96, registration of the mold segments is achieved due to the play resulting from the loose fit between the mold segments and the jaw, as well as between the jaws and their carriages.

Thereafter, the student tightens the nuts 98 to secure the mold segments to the jaws and tightens the screws 84 to secure the jaws to the carriages. Rotation of the hand wheel 94 in the opposite direction results in the separation of the mold segments, however maintaining aligned registration therebetween.

In an actual molding cycle, a student places a sufficient quantity of thermoplastic material in the extruder hopper 28 after both the extruder cylinder 30 and the parison nozzle 32 have been heated to the appropriate temperature with the heaters controlled by a suitable switch 100. An air compressor is controlled by a further switch 102 and a manual control valve 104 controls flow of pressurized air into the air cylinder 24 to depress the ram, forcing the thermoplastic charge into the cylinder 30 for liquification. The introduction of subsequent charges of thermoplastic into the cylinder 30 causes the viscous parison 15 to extrude downwardly from the heated nozzle 32 between the separated mold segments as shown in FIG. 4.

After a sufficient length of parison has been extruded, the student raises the blow needle 12 by depressing the lever knob 52 and rapidly rotates the hand wheel 94 to close the mold segments over the parison 15 with the blow needle extending upwardly into the parison 15. Thereafter, the student actuates a control (not shown) which provides a flow of air at approximately 5 psig through the blow needle 12 into the parison permitting the parison to expand smoothly and evenly to conform to the interior shape of the mold set 18.

Cooling of the parison is facilitated by heat transfer through thin walled mold segments, the spines 56, 58, the mold faces 64, 66 and the cooling webs 72 of the jaws by conduction, convection and radiation.

After an appropriate cooling cycle, the air supply to the needle 12 is terminated, the needle lowered, the mold separated and the molded article removed for finishing after which a further parison may be extruded.

Thus, it will be seen that there is provided a pedagogic molding apparatus which achieves the various objects of the invention and is well suited to meet the conditions of practical use.

As various changes might be made in the molding apparatus as above set forth, it is to be understood that all matter herein described or shown in the accompanying drawings is to be interpreted as illustrative and not in a limiting sense.

Having thus described the invention, there is claimed as new and desired to be secured by Letters Patent:

1. A pedagogic molding apparatus for instruction in the techniques of blow molding, said apparatus comprising means for extruding a hollow cylindrical parison along a vertical axis, at least one mold set, the mold set including a pair of thin walled mold segments, the apparatus further including mold supporting means including a pair of carriages, means providing horizontal translational movement of the carriages toward and away from each other, a pair of jaws, each jaw having two perpendicularly oriented panels, one panel abutting one of the mold segments and the other panel abutting a respective carriage, means adjustably securing each jaw to its respective carriage, and means adjustably mounting each mold segment to the one panel, each jaw further including a plurality of web means for cooling the mold segments, each web means extending from the one panel to the other panel, the mold set further including pilot means adapted to assist registration of the mold segments in a closed position whereby a student can set up the apparatus, practice and observe the techniques of blow molding.

2. A pedagogic molding apparatus constructed in accordance with claim 1 further including means providing a source of pressurized air, the apparatus further including a blow needle, means operatively interconnecting the source and the blow needle, and means selectively positioning the blow needle within the parison.

3. A pedagogic molding apparatus constructed in accordance with claim 1 wherein the means adjustably securing each jaw to a respective carriage includes means forming an aperture in the other panel and securement means for applying a compressive force between the panel and the carriage, the securement means having a maximum dimension in a direction parallel to the direction of translation, the aperture having a maximum dimension in a plane parallel to the direction of translation greater than the maximum dimension of the securement means, whereby adjustment of the jaws with respect to the carriage is provided.

4. A pedagogic molding apparatus constructed in accordance with claim 1 wherein the means adjustably mounting each mold segment to the one panel includes means forming an aperture in the one panel and securement means extending through said aperture, the securement means having a maximum dimension in a plane perpendicular to the direction of translation, the aperture having a maximum dimension in a plane perpendicular to the direction of translation greater than the dimension of the securement means whereby adjustment of the mold segments with respect to the jaws is provided.

5. A pedagogic molding apparatus constructed in accordance with claim 1 wherein the mold set is of low mass, each mold segment having a hollow mold cavity and an exterior wall, the mold segment thickness between the cavity and the exterior wall being in the order of one-eighth inch whereby the mold set is adapted for rapid cooling.

6. A pedagogic molding kit constructed in accordance with claim 5 further including a plurality of mold sets, each mold set including a mold cavity adapted to define the exterior configuration of a blow molded article, each of the articles being interrelated whereby a student can fabricate a shop project comprising a plurality of game playing pieces.

* * * * *